US006456513B2

(12) United States Patent

Saito

(10) Patent No.: US 6,456,513 B2

(45) Date of Patent: Sep. 24, 2002

(54) VOLTAGE CONVERSION CIRCUIT AND CONTROL CIRCUIT THEREFOR

(75) Inventor: Syuichi Saito, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/774,792

(22) Filed: Feb. 1, 2001

(30) Foreign Application Priority Data

Feb. 2, 2000 (JP) ....................................... 2000-025276

(51) Int. Cl.[7] ............................ H02M 3/06; H02M 7/25

(52) U.S. Cl. ........................... 363/59; 363/62; 307/109; 307/110; 327/536

(58) Field of Search .............................. 363/59, 60, 62; 307/109, 110; 327/535, 536

(56) References Cited

U.S. PATENT DOCUMENTS 4,095,154 A * 6/1978 Williamson ................. 318/376
4,415,961 A * 11/1983 Harmon, Jr. ................. 363/43
4,654,769 A * 3/1987 Middlebrook ................ 363/16
5,406,471 A * 4/1995 Yamanaka .................. 363/124
5,581,454 A * 12/1996 Collins ........................ 363/59
6,198,645 B1 * 3/2001 Kotowski et al. ............. 363/59
6,281,705 B1 * 8/2001 Yu .............................. 326/68

* cited by examiner

*Primary Examiner*—Bao Q. Vu

(74) *Attorney, Agent, or Firm*—Arent Fox Kintner Plotkin & Kahn

(57) ABSTRACT

A voltage conversion circuit has an improved power efficiency and a lower power consumption is described. The voltage conversion circuit includes a plurality of voltage conversion cells, each of which includes a capacitor element. A switch circuit is connected to the plurality of voltage conversion cells to selectively switch between parallel connection of a plurality of voltage conversion cells and serial connection of a plurality of voltage conversion cells. A control circuit is connected to the switch circuit to control the switch circuit to selectively perform a first voltage conversion of an input voltage by the plurality of parallel-connected voltage conversion cells and a second voltage conversion of the input voltage by the plurality of series-connected voltage conversion cells.

12 Claims, 12 Drawing Sheets

VOLTAGE CONVERSION CIRCUIT AND CONTROL CIRCUIT THEREFOR

BACKGROUND OF THE INVENTION

The present invention relates to a voltage conversion circuit. More particularly, it relates to a voltage conversion circuit that generates an internal supply voltage by stepping up or stepping down an external supply voltage.

Particularly, a supply voltage generating circuit (generator), which is provided in a semiconductor memory device such as DRAM, generates an internal supply voltage, such as a stepped-up voltage supplied to word lines and a negative voltage supplied to the substrate, using an external supply voltage. When the external supply voltage becomes lower due to reduction in consumed power, the internal supply voltage also becomes lower. This requires a supply voltage generator with a sufficient current supplying capability and low power consumption even when an external supply voltage is relatively low.

FIG. 1A is a schematic circuit diagram of a conventional stepped-up voltage generator 100. A supply voltage Vcc is supplied to the anode of a diode D1 from an external apparatus. The cathode of the diode D1 is connected to the anode of a diode D2. The cathode of the diode D2 is connected to the anode of a diode D3, and a stepped-up voltage Vpp is output from the cathode of the diode D3. A switch circuit SW1 is connected in parallel to the diode D3.

A first input signal IN1 is supplied to a node N1 disposed between the diodes D1 and D2 via a capacitor C1. A second input signal IN2 is supplied to a node N2 disposed between the diodes D2 and D3 via a capacitor C2.

The stepped-up voltage generator 100 can selectively perform a one-stage step-up operation or two-stage step-up operation. In the one-stage step-up operation mode, when the switch circuit SW1 is conducting, the clock input signal IN1 having a predetermined frequency and the clock input signal IN2 having a fixed level are supplied as shown in FIGS. 1B and 1C. The pumping operation by the diode D1 and the capacitor C1 steps up the voltage at the node N1 to higher than the level of the supply voltage Vcc, so that the stepped-up voltage Vpp is supplied to a load circuit via the diode D2 and the switch circuit SW1. In the one-stage step-up operation, the stepped-up voltage Vpp is ideally twice the supply voltage Vcc.

In the two-stage step-up operation mode, as shown in FIG. 2A, the clock input signals IN1 and IN2 have different phases and predetermined frequencies as shown in FIGS. 2B and 2C, and are supplied when the switch circuit SW1 is nonconducting. The pumping operation by the diode D1 and the capacitor C1 and the pumping operation by the diode D2 and the capacitor C2 are alternately performed to step up the voltage at the node N2 higher than the level of the supply voltage Vcc, so that the stepped-up voltage Vpp is supplied to the load circuit via the diode D3. In the two-stage step-up operation, the stepped-up voltage Vpp is ideally three times the supply voltage Vcc.

FIG. 3 is a graph showing the relationship between the output voltage and the maximum supply current in the stepped-up voltage generator. The horizontal axis shows the stepped up voltage Vpp in terms of a magnification with respect to the supply voltage Vcc. The vertical axis represents the allowable supply current.

With the same output voltage Vpp, the allowable supply current I2 in the two-stage step-up operation mode is larger than the allowable supply current I1 in the one-stage step-up operation mode. This is because the capacitor C1 alone contributes to the pumping operation in the one-stage step-up operation mode whereas the capacitors C1 and C2 contribute to the pumping operation in the two-stage step-up operation mode. However, the two-stage step-up operation has a lower power efficiency than the one-stage step-up operation and thus suffers greater power consumption. As shown in FIG. 3, Ip indicates the consumed current of the load circuit to which the stepped-up voltage Vpp is supplied. The consumed current Ip increases in proportion to the voltage of the stepped-up voltage Vpp.

To reduce the power consumption of the stepped-up voltage generator while keeping a sufficient supply current to the load circuit, it is desirable that the one-stage step-up operation and the two-stage step-up operation should be switched at a voltage Va (set switch voltage) at which the consumed current Ip intersects the allowable supply current I1 of. the one-stage step-up operation mode. That is, the one-stage step-up operation is performed when $Vpp<Va$, and the two-stage step-up operation is performed when $Va<Vpp$.

In a memory device, such as DRAM, the supply voltage Vpp is supplied to a selected word line and is higher than the supply voltage Vcc by the threshold value of cell transistors or larger. The difference between the supply voltage Vpp and the supply voltage Vcc therefore becomes substantially constant regardless of the level of the supply voltage Vcc. The higher the supply voltage Vcc becomes, the smaller the ratio of the supply voltage Vpp to the supply voltage Vcc becomes.

The consumed current Ip is substantially proportional to the supply voltage Vpp, and the absolute amount of the allowable supply currents I1 and I2 increase as the supply voltage Vcc rises. Therefore, as the supply voltage Vcc becomes higher, the consumed current Ip is relatively shifted to the lower portion of the graph of FIG. 3.

When the supply voltage Vcc is relatively high, therefore, the set switch voltage Va moves to a high-voltage side. This widens the range of the supply voltage Vpp that can supply the allowable supply current I1 greater than the consumed current Ip in the one-stage step-up operation, thus improving the power efficiency of the stepped-up voltage generator 100.

When the supply voltage Vcc is relatively low, the set switch voltage moves to a low-voltage side. This narrows the range of the supply voltage Vpp that can supply the allowable supply current I1 greater than the consumed current Ip in the one-stage step-up operation, thus lowering the power efficiency of the stepped-up voltage generator 100.

The set switch voltage Va is set based on the supply voltage Vcc. It is however difficult to accurately detect the set switch voltage Va based on the supply voltage Vcc. If the one-stage step-up operation is changed to the two-stage step-up operation when the supply voltage Vpp higher than the set switch voltage Va is output, the allowable supply current I1 falls to or below the consumed current Ip. This causes the supply voltage Vpp to fall.

One way to prevent the allowable supply current I1 from becoming lower than the consumed current Ip is to change the one-stage step-up operation to the two-stage step-up operation when the supply voltage Vpp sufficiently lower than the set switch voltage Va is output. In this case, however, the two-stage step-up operation is performed in the voltage range that is sufficient for the one-stage step-up operation. This lowers the power efficiency of the stepped-up voltage generator and thus increases the consumed power of the entire device.

SUMMARY OF THE INVENTION

Accordingly, it is an object of the present invention to provide a voltage conversion circuit which has an improved power efficiency and lower power consumption.

In a first aspect of the present invention, a voltage conversion circuit is provided. The voltage conversion circuit includes a plurality of voltage conversion cells each including a capacitor element. A switch circuit is connected to the plurality of voltage conversion cells to selectively switch between parallel connections of a plurality of voltage conversion cells and serial connections of a plurality of voltage conversion cells. A control circuit is connected to the switch circuit to control the switch circuit to selectively perform first voltage conversion of an input voltage by the plurality of parallel-connected voltage conversion cells and second voltage conversion of the input voltage by the plurality of series-connected voltage conversion cells.

In a second aspect of the present invention, a voltage conversion circuit is provided. The voltage conversion circuit includes a plurality of voltage conversion cells, each of which includes a capacitor element. A plurality of switch circuits are connected between an input voltage and an output terminal of the voltage conversion circuit. The plurality of voltage conversion cells are respectively connected to a plurality of nodes between adjoining switch circuits. One or more cell-connection switch circuits are connected between one or more of the plurality of nodes and the output terminal of the voltage conversion circuit. A control circuit is connected to the plurality of switch circuits and the one or more cell-connection switch circuits to control the plurality of switch circuits and the one or more cell-connection switch circuits to selectively perform first voltage conversion of an input voltage by the plurality of parallel-connected voltage conversion cells and second voltage conversion of the input voltage by the plurality of series-connected voltage conversion cells.

In a third aspect of the present invention, a voltage conversion circuit is provided. The voltage conversion circuit includes a plurality of voltage conversion cells, each of which includes a capacitor element. A plurality of switch circuits are connected between an input voltage and an output terminal of the voltage conversion circuit. The plurality of voltage conversion cells are respectively connected to a plurality of nodes between adjoining switch circuits. One or more cell-connection switch circuits are connected to one or more pairs of nodes in parallel to the plurality of switch circuits. A control circuit is connected to the plurality of switch circuits and the one or more cell-connection switch circuits to control the plurality of switch circuits and the one or more cell-connection switch circuits to selectively perform first voltage conversion of an input voltage by the plurality of parallel-connected voltage conversion cells and second voltage conversion of the input voltage by the plurality of series-connected voltage conversion cells.

In a fourth aspect of the present invention, a control circuit for a voltage conversion circuit is provided. The voltage conversion circuit includes a plurality of voltage conversion cells, each of which includes a capacitor element, and a switch circuit, connected to the plurality of voltage conversion cells, for selectively switching between parallel connection of a plurality of voltage conversion cells and serial connection of a plurality of voltage conversion cells. The control circuit is connected to the switch circuit to control the switch circuit to selectively perform first voltage conversion of an input voltage by the plurality of parallel-connected voltage conversion cells and second voltage conversion of the input voltage by the plurality of series-connected voltage conversion cells.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

Figure 1:
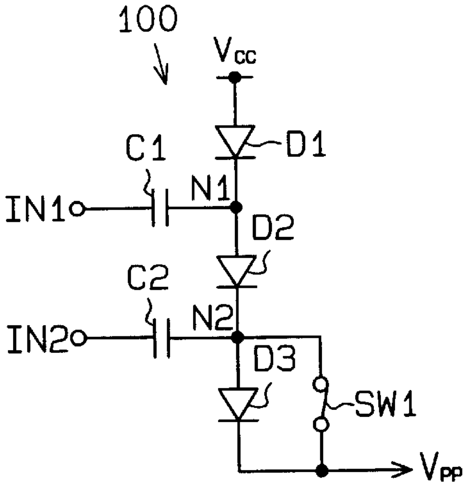
Fig.1 (a) (Prior Art)
FIG. 1A is a schematic circuit diagram of a conventional stepped-up voltage generator with a switch circuit being conducting.
FIGS. 1B and 1C are waveform diagrams of input signals supplied to the stepped-up voltage generator of FIG. 1A.
Figure 1:
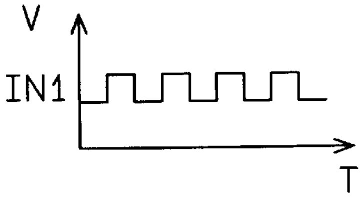
Fig.1 (b) (Prior Art)
Figure 1:
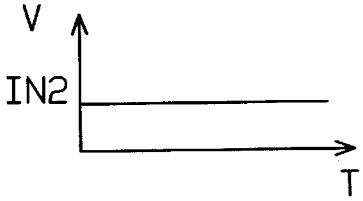
Fig.1 (c) (Prior Art)

In the drawings, like numerals are used for like elements throughout.

Figure 4:
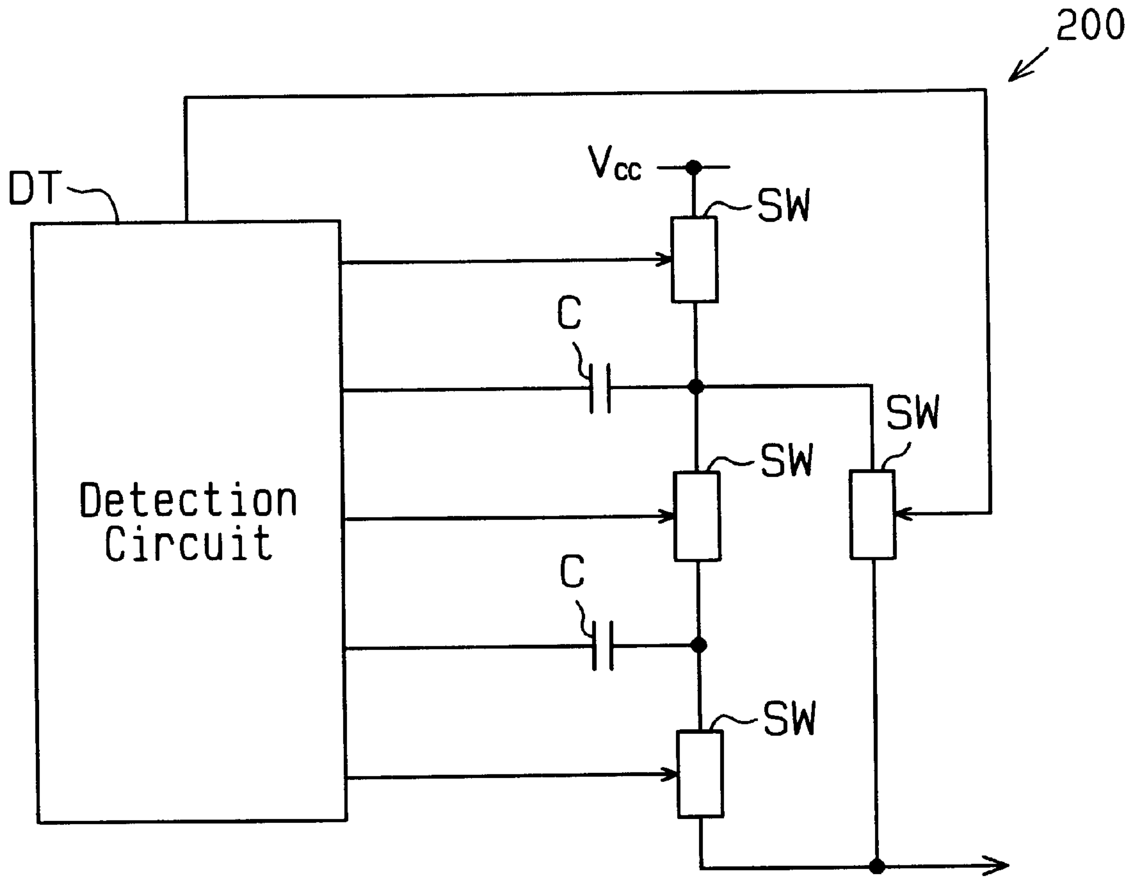
FIG. 4 is a schematic block diagram of a voltage conversion circuit according to a first embodiment of the present invention.

As shown in FIG. 4, a voltage conversion circuit 200 according to a first embodiment of the present invention includes a plurality of voltage conversion cells C, each of which preferably includes a capacitor element. A plurality of switch circuits SW are used to select either parallel connection of the voltage conversion cells C or series connection thereof. A detection circuit DT controls the switch circuits SW such that voltage conversion of an input voltage Vcc is performed by series-connected voltage conversion cells C when the input voltage Vcc is relatively low, and voltage conversion of the input voltage Vcc is performed by parallel-connected voltage conversion cells C when the input voltage Vcc is relatively high.

Figure 5A:
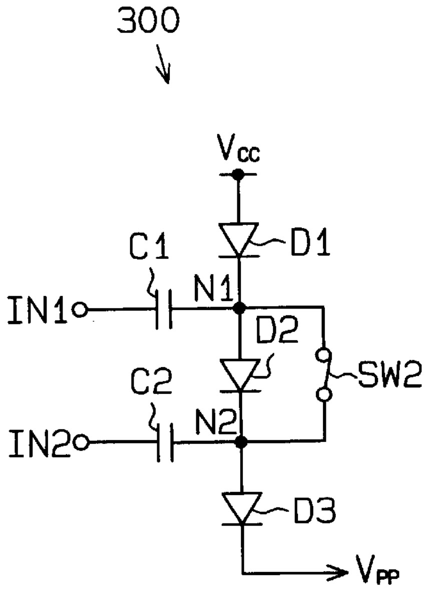
FIG. 5A is a schematic circuit diagram of a stepped-up voltage generator with a switch circuit being conducting according to a second embodiment of the present invention.
Figure 5B:
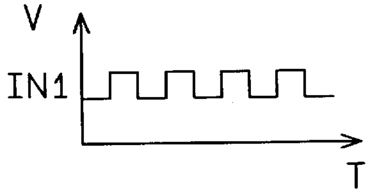
FIGS. 5B and 5C are waveform diagrams of input signals supplied to the stepped-up voltage generator of FIG. 5A.
Figure 5C:
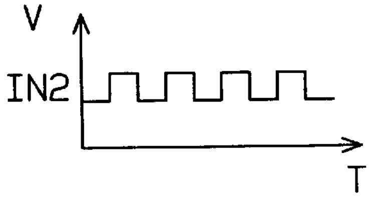
Figure 6A:
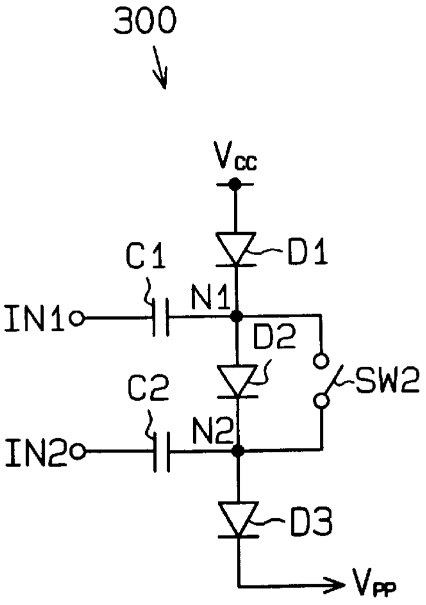
FIG. 6A is a schematic circuit diagram of the stepped-up voltage generator with a switch circuit being non-conducting according to the second embodiment of the present invention.

As shown in FIGS. 5A and 6A, a stepped-up voltage generator 300 according to a second embodiment of the invention includes three diodes D1, D2 and D3connected in series between a voltage supply Vcc and the output terminal of the stepped-up voltage generator 300, a capacitor C1 connected to a node N1 between the diodes D1 and D2, a capacitor C2 connected to a node N2 between the diodes D2 and D3, and a switch circuit SW2 connected in parallel to the diode D2. In a one-stage step-up operation mode, the switch circuit SW2 is conducting as shown in FIG. 5A, and the clock input signals IN1 and IN2 having the same phase, as shown in FIGS. 5B and 5C, are respectively supplied to the capacitors C1 and C2.

Figure 2:
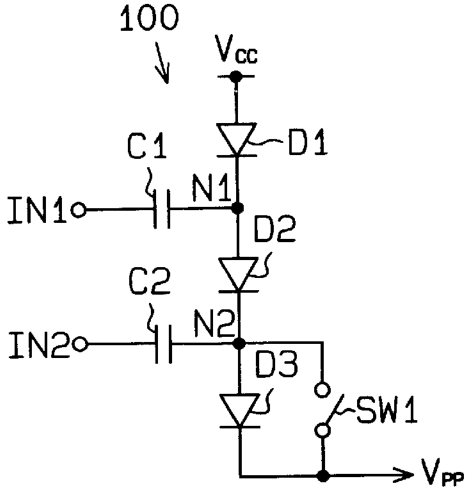
Fig.2 (a) (Prior Art)
FIG. 2A is a schematic circuit diagram of the conventional stepped-up voltage generator with a switch circuit being non-conducting.
FIGS. 2B and 2C are waveform diagrams of input signals supplied to the stepped-up voltage generator of FIG. 2A.
Figure 2:
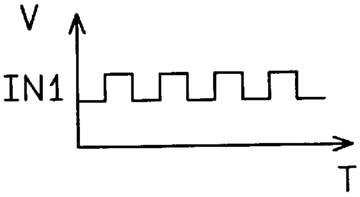
Fig.2 (b) (Prior Art)
Figure 2:
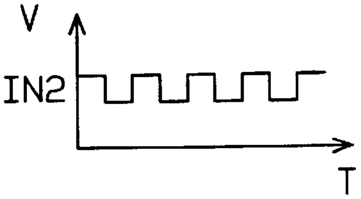
Fig.2 (c) (Prior Art)
Figure 3:
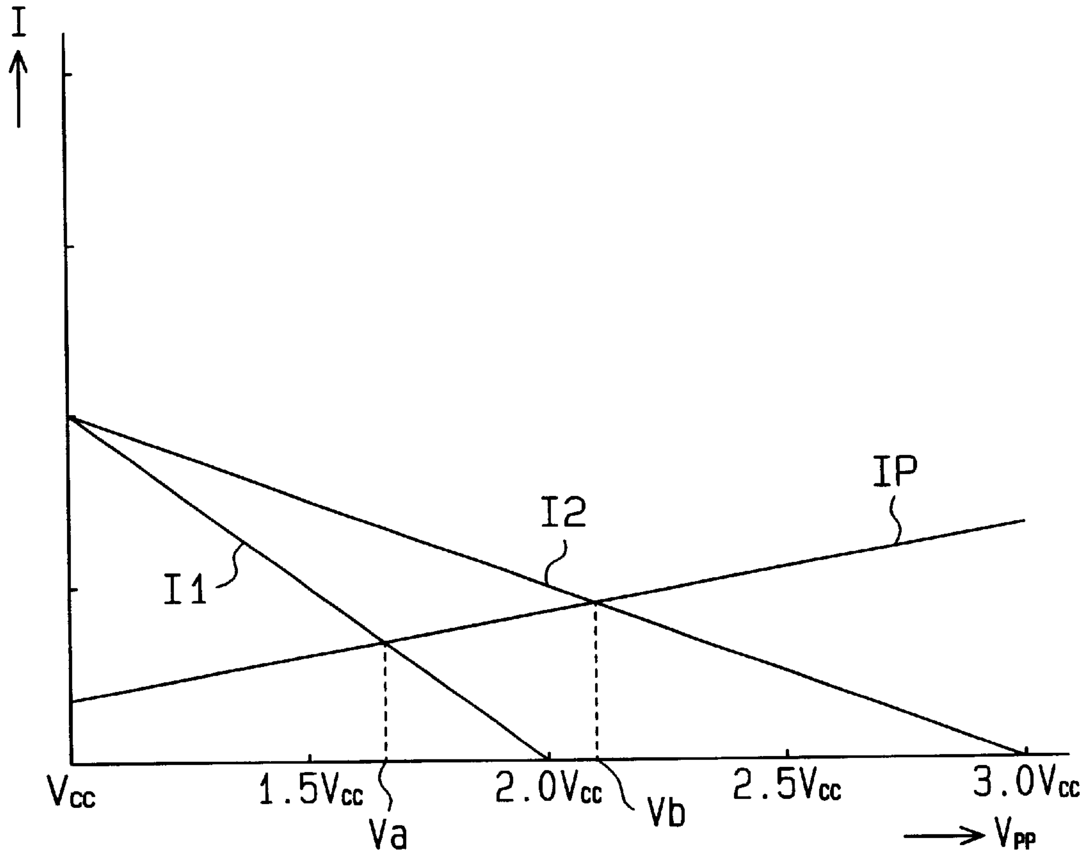
Fig.3 (Prior Art)
FIG. 3 is a graph showing the relationship between the output voltage and the maximum supply current in the stepped up voltage generator of FIGS. 1A and 2A.
Figure 6B:
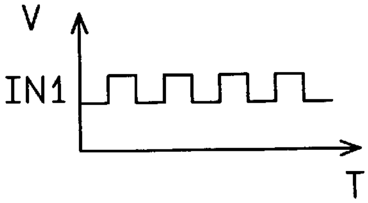
FIGS. 6B and 6C are waveform diagrams of input signals supplied to the stepped-up voltage generator of FIG. 6A.
Figure 6C:
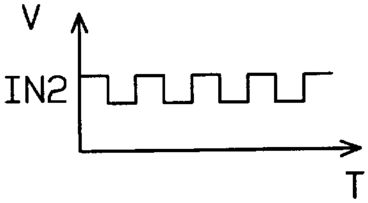

In a two-stage step-up operation mode, the switch circuit SW2 is nonconducting as shown in FIG. 6A, and the clock input signals IN1 and IN2 having the opposite phases, as shown in FIGS. 6B and 6C, are respectively supplied to the capacitors C1 and C2. The operation of the stepped-up voltage generator 300 in the two-stage step-up operation mode is the same as the operation of the stepped-up voltage generator 100 of FIG. 2A. As apparent from FIG. 7, the allowable supply current I2 of the two-stage step-up operation mode behaves in the same way as the allowable supply current I2 of the prior art.

A maximum supply current I1*a* of the one-stage step-up operation mode is twice the maximum supply current I1 of the prior art. This is because both terminals (i.e., the nodes N1 and N2) of the diode D2 are short-circuited in the one-stage step-up operation so that the diode D1 and the capacitors C1 and C2 perform a pumping operation. That is, the capacitors C1 and C2 operate in parallel to substantially double the capacitance.

The stepped-up voltage generator 300 of the second embodiment has the following advantages.

(1) When the capacitances of the capacitors C1 and C2 are the same as those in the prior art, the maximum supply current I1*a* of the one-stage step-up operation mode increases to a double of the maximum supply current I1 of the prior art.

Figure 7:
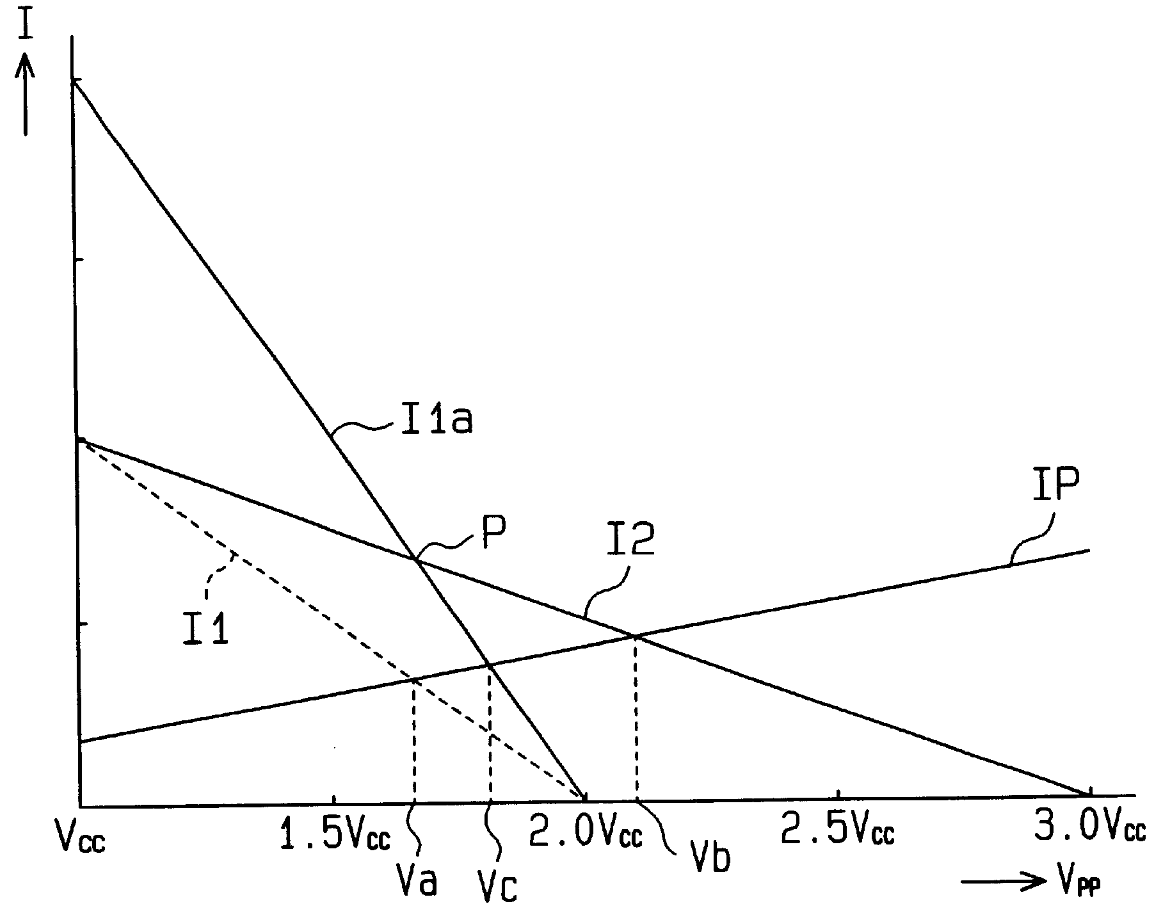
FIG. 7 is a graph showing the relationship between the output voltage and the maximum supply current in the stepped-up voltage generator according to the second embodiment of the present invention.

(2) As shown in FIG. 7, a voltage Vc, at which the consumed current Ip of the load circuit crosses the maximum supply current I1*a* of the one-stage step-up operation mode, is higher than the corresponding voltage Va of the prior art. This widens the range of the stepped-up voltage Vpp generated in the one-stage step-up operation mode, thus improving the power efficiency of the stepped-up voltage generator 300. The maximum supply current I1*a* is adequately adjusted by changing the capacitance values of the capacitors C1 and C2.

Figure 8:
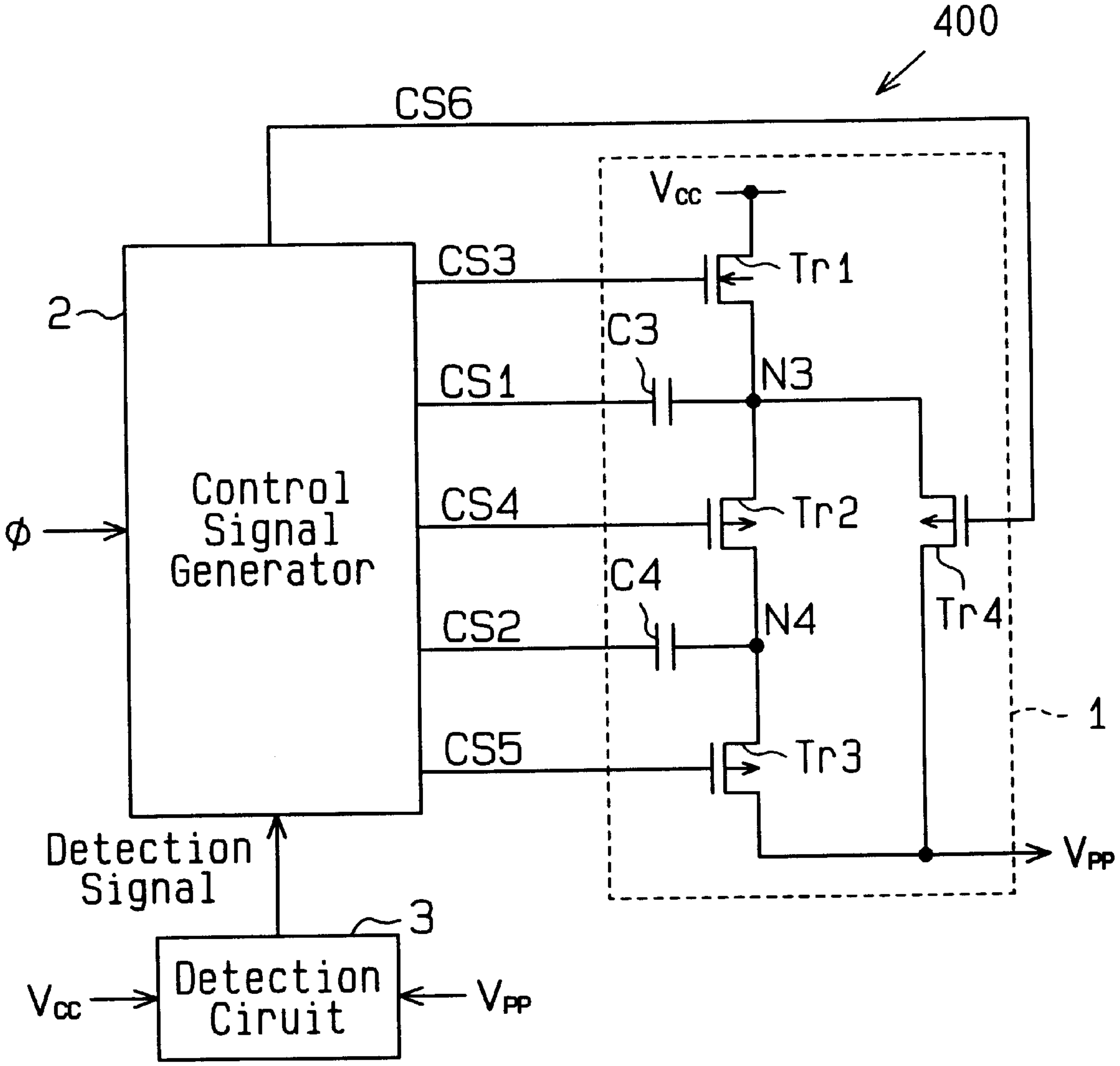
FIG. 8 is a schematic circuit diagram of a stepped-up voltage generator according to a third embodiment of the present invention.

As shown in FIG. 8, a stepped-up voltage generator 400 according to a third embodiment of the present invention includes a step-up circuit 1, a control signal generator 2for controlling the operation of the step-up circuit 1, and a detection circuit 3 for detecting the voltage of a voltage supply Vcc.

The step-up circuit 1 includes an N channel MOS (NMOS) transistor Tr1 and P channel MOS (PMOS) transistors Tr2 and Tr3. The drain of the NMOS transistor Tr1 is connected to the voltage supply Vcc and the source thereof is connected to the source of the PMOS transistor Tr2. The drain of the PMOS transistor Tr2 is connected to the source of the PMOS transistor Tr3. A stepped-up voltage Vpp is output from the drain of the transistor Tr3. A PMOS transistor Tr4 is connected in parallel to the transistors Tr2 and Tr3.

The sources (node N3) of the transistors Tr1 and Tr2 are connected to the first terminal of a capacitor C3 whose second terminal is supplied with a control signal CS1 from the control signal generator 2.

The drain (node N4) of the transistor Tr2 is connected to the first terminal of a capacitor C4 whose second terminal is supplied with a control signal CS2 from the control signal generator 2. Control signals CS3 and CS4 from the control signal generator 2 are supplied to the gates of the transistor Tr1 and the transistor Tr2, respectively. Control signals CS5 and CS6 from the control signal generator 2are supplied to the gates of the transistor Tr3 and the transistor Tr4 respectively.

The transistors Tr1 to Tr3 are equivalent to the diodes D1–D3 in the second embodiment, and the transistor Tr4 is equivalent to the switch circuit SW2. The one-stage step-up operation and the two-stage step-up operation are selectively performed by controlling the ON/OFF actions of the transistors Tr1–Tr4.

Figure 9:
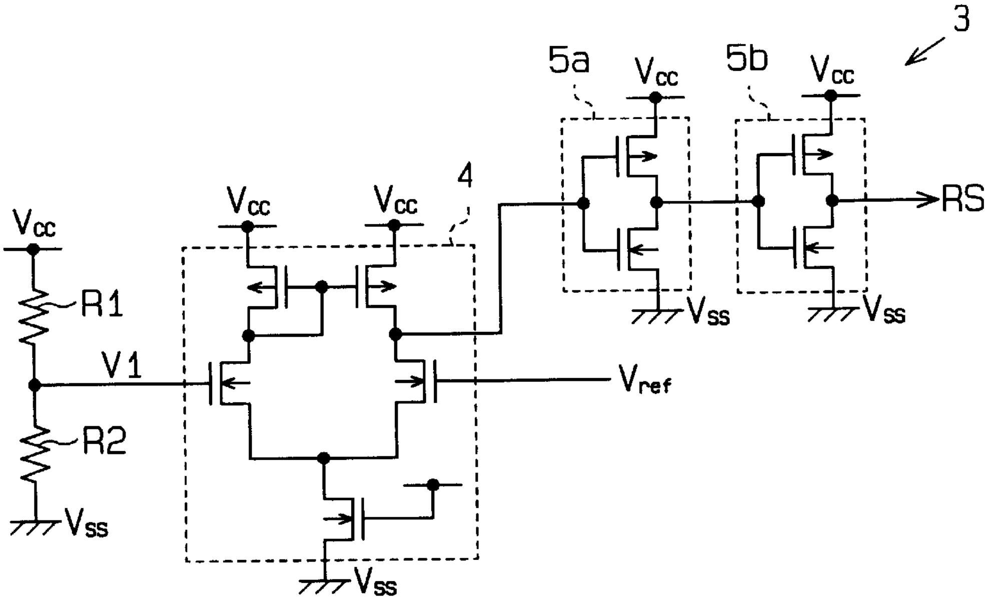
FIG. 9 is a schematic circuit diagram of a detection circuit of the stepped-up voltage generator of FIG. 8.

As shown in FIG. 9, the detection circuit 3 includes resistors R1 and R2 connected in series between the voltage supply Vcc and a voltage supply Vss, a current mirror circuit 4, and inverter circuits 5*a* and 5*b*. The resistors R1 and R2 divide the differential voltage between the voltage supply Vcc and the voltage supply Vss and generate a comparison voltage V1.

The comparison voltage V1 is supplied to the first input terminal of the current mirror circuit 4, and a reference voltage Vref is supplied to the second input terminal of the current mirror circuit 4. The output signal of the current mirror circuit 4 is output as a detection signal RS via the inverter circuits 5*a* and 5*b*.

The detection signal RS is at an H level when the comparison voltage V1 is higher than the reference voltage Vref and at an L level when the comparison voltage V1 is lower than the reference voltage Vref. In the third embodiment, the resistors R1 and R2 have the same resistance, and the reference voltage Vref is set to a half the reference supply voltage of the voltage supply Vcc. Therefore, the detection signal RS goes to the H level when the supply voltage Vcc is higher than the reference supply voltage and goes to the L level when the supply voltage Vcc is lower than the reference supply voltage.

Figure 10:
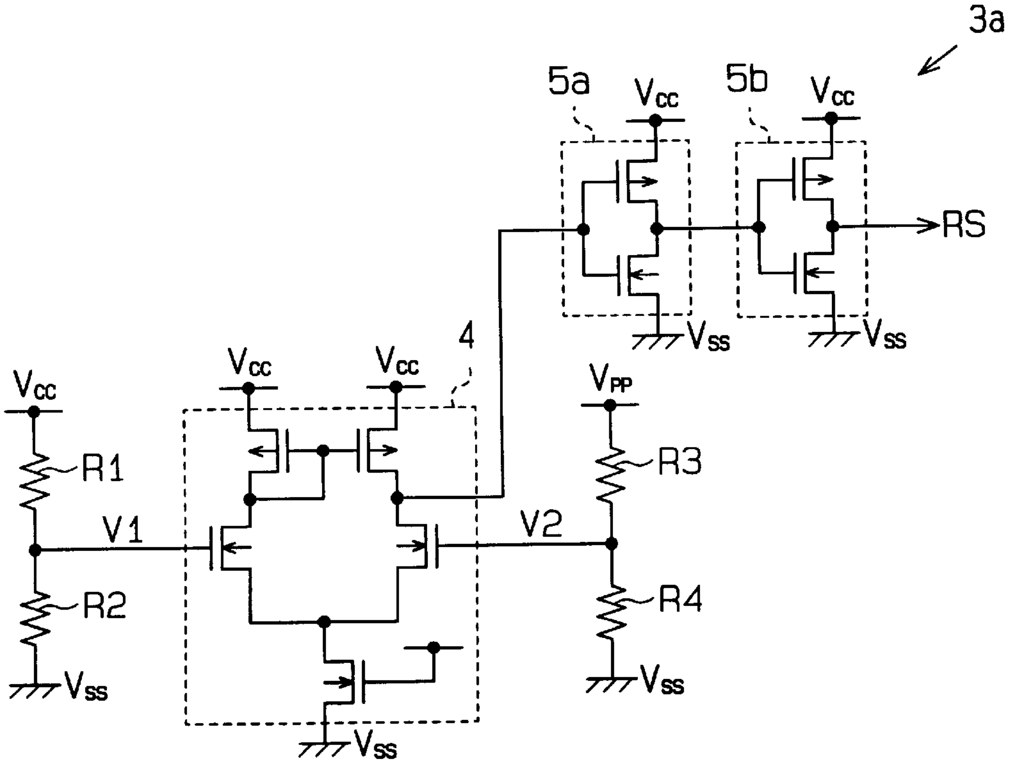
FIG. 10 is a schematic circuit diagram showing an alternative detection circuit of the stepped-up voltage generator of FIG. 8.

A detection circuit 3*a* shown in FIG. 10 may be used in place of the detection circuit 3. The current mirror circuit 4 of the detection circuit 3*a* is supplied with a comparison voltage V2, which is produced by dividing the differential voltage between the supply voltage Vpp and the supply voltage Vss by resistors R3 and R4.

In the detection circuit 3*a*, the resistors R1 and R2 have the same resistance, and the ratio of the resistance of the resistor R3 to the resistance of the resistor R4 is set to 2:1 when the supply voltage Vpp of 4.5 V is generated based on the supply voltage Vcc of, for example, 3V. In this case, the detection signal RS has the H level when the supply voltage Vcc is higher than 3 V and has the L level when the supply voltage Vcc is lower than 3 V.

Figure 11:
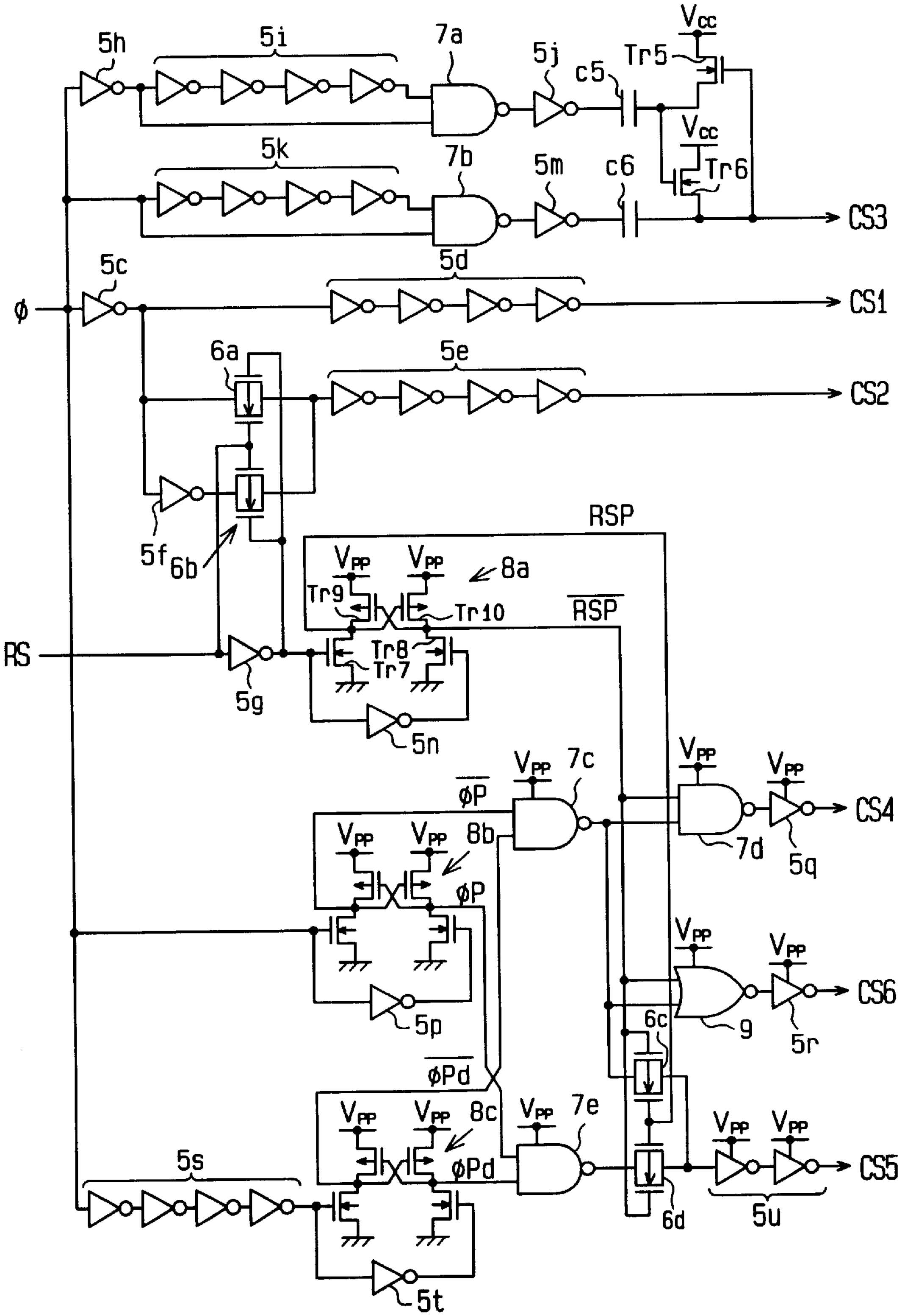
FIG. 11 is a schematic circuit diagram of a control signal generator of the stepped-up voltage generator of FIG. 8.

The control signal generator 2 of FIG. 8 will now be described with reference to FIG. 11. A clock signal ϕ, which has a predetermined frequency, is supplied to the control signal generator 2 and is output as the control signal CS1 via an inverter circuit 5*c* and four stages of inverter circuit group 5*d*.

The clock signal ϕ inverted by the inverter circuit 5*c* is output as the control signal CS2 via a transfer gate 6*a* and four stages of inverter circuit group 5*e*. The clock signal ϕ that has been inverted by the inverter circuit 5*c* is supplied to the inverter circuit group 5*e* via an inverter circuit 5*f* and a transfer gate 6*b*.

The detection signal RS is supplied to the N channel gate of the transfer gate 6*a* and the P channel gate of the transfer gate 6*b*. The detection signal RS inverted by an inverter circuit 5*g* is supplied to the P channel gate of the transfer gate 6*a* and the N channel gate of the transfer gate 6*b*.

When the detection signal RS is at the H level, the transfer gate 6*a* is conducting and the transfer gate 6*b* is nonconducting, so that the control signals CS1 and CS2 having the same phase are generated. When the detection signal RS is at the L level, the transfer gate 6*b* is conducting and the transfer gate 6*a* is nonconducting, so that the control signals CS1 and CS2 having the opposite phases are generated.

The clock signal ϕ inverted by an inverter circuit 5*h* is supplied to the first input terminal of a NAND gate 7*a*. The clock signal ϕ is supplied to the second input terminal of the NAND gate 7*a* via the inverter circuit 5*h* and four stages of inverter circuit group 5*i*. The output signal of the NAND gate 7*a* is supplied to an inverter circuit 5*j*.

When the clock signal ϕ rises to the H level from the L level, the output signal of the inverter circuit 5*j* falls to the L level from the H level. When the clock signal ϕ falls, the output signal of the inverter circuit 5*j* rises.

The time for the output signal of the inverter circuit 5*j* to rise after the falling of the clock signal ϕ is delayed from the time for the output signal of the inverter circuit 5*j* to fall after the rising of the clock signal ϕ by the operational delays of the inverter circuit 5*i*.

The output signal of the inverter circuit 5*j* is supplied to the first terminal of a capacitor C5 whose second terminal is connected to the source of an NMOS transistor Tr5 and the gate of an NMOS transistor Tr6. The supply voltage Vcc is supplied to the drains of the transistors Tr5 and Tr6.

The clock signal ϕ is supplied to the first input terminal of a NAND gate 7*b* and is supplied to the second input terminal of the NAND gate 7*b* via four stages of inverter circuit group 5*k*. The output signal of the NAND gate 7*b* is supplied to an inverter circuit 5*m*. The output signal of the inverter circuit 5*m* rises and falls at the opposite timings to those of the output signal of the inverter circuit 5*j*.

The output signal of the inverter circuit 5*m* is supplied to the first terminal of a capacitor C6 whose second terminal is connected to the gate of the transistor Tr5 and the source of the transistor Tr6. The control signal CS3 is output from the second terminal of the capacitor C6.

When the output signals of the inverter circuits 5*j* and 5*m* alternately are at the H level, the capacitive coupling of the capacitors C5 and C6 causes the transistors Tr5 and Tr6 to be alternately turned on. At this time, the gate voltage of the transistors Tr5 and Tr6 is stepped up to a higher level than the supply voltage Vcc. When the transistors Tr5 and Tr6 are turned on, the source voltage of the transistors Tr5 and Tr6 rises to the level of the supply voltage Vcc and is stepped up by the capacitive coupling of the capacitors C5 and C6. That is, when the clock signal ϕ rises, the voltage of the control signal CS3 is stepped up from the level of the supply voltage Vcc in accordance with a predetermined step-up range based on the capacitors C5 and C6.

The detection signal RS is supplied to a differential circuit 8*a* via the inverter circuit 5*g*. The output signal of the inverter circuit 5*g* is supplied to the gate of an NMOS transistor Tr7. The output signal of the inverter circuit 5*g* is supplied to the gate of an NMOS transistor Tr8 via an inverter circuit 5*n*.

The sources of the transistors Tr7 and Tr8 are connected to the voltage supply Vss. The drain of the transistor Tr7 is connected to the drain of a PMOS transistor Tr9 and the gate of a PMOS transistor Tr10. The drain of the transistor Tr8 is connected to the drain of the PMOS transistor Tr10 and the gate of the PMOS transistor Tr9. The sources of the transistors Tr9 and Tr10 are supplied with the voltage supply Vpp.

In a differential circuit 8*a*, complementary output signals RSP and /RSP are output from the drains of the transistors Tr7 and Tr8 in accordance with a detection signal RS. The output signal RSP has the same phase as the detection signal RS and at an H level, which is the level of the supply voltage Vpp, or an L level, which is the level of the supply voltage Vss.

The clock signal ϕ is supplied to a differential circuit 8*b* and an inverter circuit 5*p*. The differential circuit 8*b* outputs complementary output signals ϕp and /ϕp. The output signal ϕp has the same phase as the clock signal ϕ and at an H level, which is the level of the supply voltage Vpp, or an L level, which is the level of the supply voltage Vss. The differential circuit 8*b* and the inverter circuit 5*p* have the same structures respectively as the differential circuit 8*a* and the inverter circuit 5*n*. The output signal /ϕp is supplied to the first input terminal of a NAND gate 7*c* and the output signal ϕp is supplied to the first input terminal of a NAND gate 7*e*.

The clock signal ϕ is supplied to a differential circuit 8*c* and an inverter circuit 5*t* via four stages of inverter circuit group 5*s*. The differential circuit 8*c* outputs complementary output signals ϕpd and /ϕpd. The differential circuit 8*c* has the same structure as the differential circuit 8*a*. The output signal ϕpd is delayed from the output signal ϕp of the differential circuit 8*b* by the operational delay time of the inverter circuit group 5*s*. The output signal /ϕpd is delayed from the output signal /ϕp of the differential circuit 8*b* by the operational delay time of the inverter circuit group 5*s*.

The output signal /ϕpd is supplied to the second input terminal of the NAND gate 7*c*, and the output signal ϕpd is supplied to the second input terminal of the NAND gate 7*e*.

The output signal of the NAND gate 7*c* is supplied to the first input terminal of a NAND gate 7*d* whose second input terminal is supplied with the output signal /RSP of the differential circuit 8*a*. The output signal of the NAND gate 7*d* is output as the control signal CS4 via an inverter circuit 5*q*.

The control signal CS4 is fixed to the L level regardless of the level of the output signal of the NAND gate 7*c* when the detection signal RS is at the H level. When the detection signal RS is at the L level, the control signal CS4 rises in accordance with the rising of the clock signal ϕ and falls in accordance with the falling of the clock signal ϕ. At this time, the control signal CS4 falls with a delay of the operational delay time of the inverter circuit group 5*s* from the falling of the clock signal ϕ.

The output signal of the NAND gate 7*c* is supplied to the first input terminal of a NOR gate 9, and the output signal /RSP from the differential circuit 8*a* is supplied to the second input terminal of the NOR gate 9. The output signal of the NOR gate 9 is output as the control signal CS6 via an inverter circuit 5*r*.

The control signal CS6 is fixed to the H level regardless of the level of the output signal of the NAND gate 7*c* when the detection signal RS is at the L level. When the detection signal RS is at the H level, the control signal CS6 rises in accordance with the rising of the clock signal ϕ and falls in accordance with the falling of the clock signal ϕ. At this time, the control signal CS6 falls with a delay of the operational delay time of the inverter circuits 5*s* from the falling of the clock signal ϕ.

The output signal of the NAND gate 7*c* is output as the control signal CS5 via a transfer gate 6*c* and two stages of inverter circuit group 5*u*. The output signal of the NAND gate 7*e* is output as the control signal CS5 via a transfer gate 6*d* and the inverter circuit group 5*u*.

The output signal /RSP of the differential circuit 8*a* is supplied to the P channel gate of the transfer gate 6*c* and the N channel gate of the transfer gate 6*d*. The output signal RSP of the differential circuit 8*a* is supplied to the N channel gate of the transfer gate 6*c* and the P channel gate of the transfer gate 6*d*.

When the detection signal RS goes to the H level, the transfer gate 6*c* is conducting and the transfer gate 6*d* is nonconducting. As a result, the output signal of the NAND gate 7*c* is output as the control signal CS5 via the inverter circuit group 5*u*. At this time, the control signal CS5 has the same phase as the clock signal ϕ.

When the detection signal RS goes to the L level, the transfer gate 6*c* is nonconducting and the transfer gate 6*d* is conducting. As a result, the output signal of the NAND gate 7*e* is output as the control signal CS5 via the inverter circuit group 5*u*. At this time, the control signal CS5 has the opposite phase to that of the clock signal ϕ.

The falling of the control signal CS5 with respect to the clock signal ϕ is delayed from the rising of the control signal CS5 with respect to the clock signal ϕ by the operational delay time of the inverter circuit group 5*s*.

The operation of the stepped-up voltage generator 400 will now be described referring to FIGS. 12 and 13. [Two-stage Step-up Operation]

Figure 12:
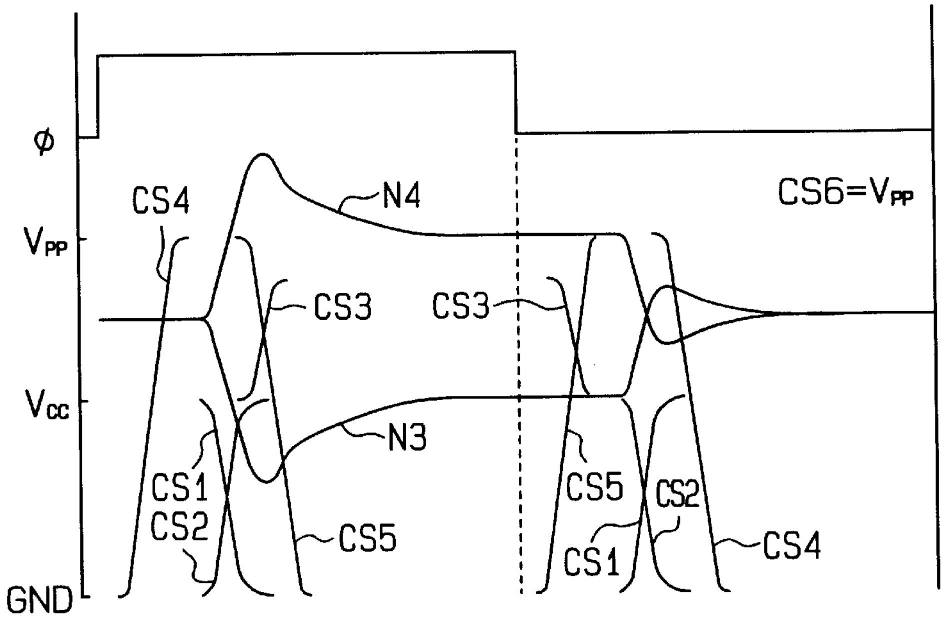
FIG. 12 is a timing waveform diagram illustrating the two-stage step-up operation of the stepped-up voltage generator of FIG. 8.

When the voltage of the voltage supply Vcc is lower than a predetermined voltage, the detection circuit 3 outputs the L-level detection signal RS and the two-stage step-up operation is performed, as shown in FIG. 12.

The control signal generator 2 provides the control signal CS6, whose level is fixed to the level of the supply voltage Vpp, to the transistor Tr4 of the step-up circuit 1, thus turning off the transistor Tr4. The transfer gate 6*a* is nonconducting, and the transfer gate 6*b* is conducting, so that control signals CS1 and CS2 having the opposite phases are output. The transfer gate 6*c* is nonconducting, and the transfer gate 6*d* is conducting, so that the output signal of the NAND gate 6*e* is output as the control signal CS5.

Under this situation, when the clock signal ϕ rises, the control signal CS4 rises to the level of the supply voltage Vpp from the level of the supply voltage Vss, thereby turning off the transistor Tr2. Then, the control signal CS1 falls, and the control signal CS2 rises. As a result, the potential at the node N3 falls, and the potential at the node N4 rises. Then, the control signal CS3 rises from the level of the supply voltage Vcc, and the control signal CS5 falls to the level of the supply voltage Vss from the level of the supply voltage Vpp. This turns on the transistor Tr1, so that the potential at the node N3 rises to the level of the supply voltage Vcc. As a result, the transistor Tr3 is turned on, causing the charges at the node N4 to be output as the supply voltage Vpp.

When the clock signal ϕ falls, the control signal CS3 falls to the level of the supply voltage Vcc. Since the potential at the node N3 is at the level of the supply voltage Vcc, the transistor Tr1 is turned off. Further, the control signal CS5 rises to the level of the supply voltage Vpp from the level of the supply voltage Vss, thus turning off the transistor Tr3. Then, the control signal CS1 goes up to the H level, and the control signal CS2 goes down to the L level. Consequently, the voltage at the node N3 rises, and the voltage at the node N4 falls. The control signal CS4 falls to the level of the supply voltage Vss, turning on the transistor Tr2. This short-circuits the nodes N3 and N4, so that the voltages at the nodes N3 and N4 become even.

The above-described operation is repeated in accordance with the rising and falling of the clock signal ϕ, thereby generating the stepped-up voltage Vpp. In this case, the two-stage step-up operation is performed when the capacitors C3 and C4 sequentially perform the step-up operations, so that a relatively large stepped-up voltage Vpp with respect to the supply voltage Vcc is generated. [One-stage Step-up Operation]

Figure 13:
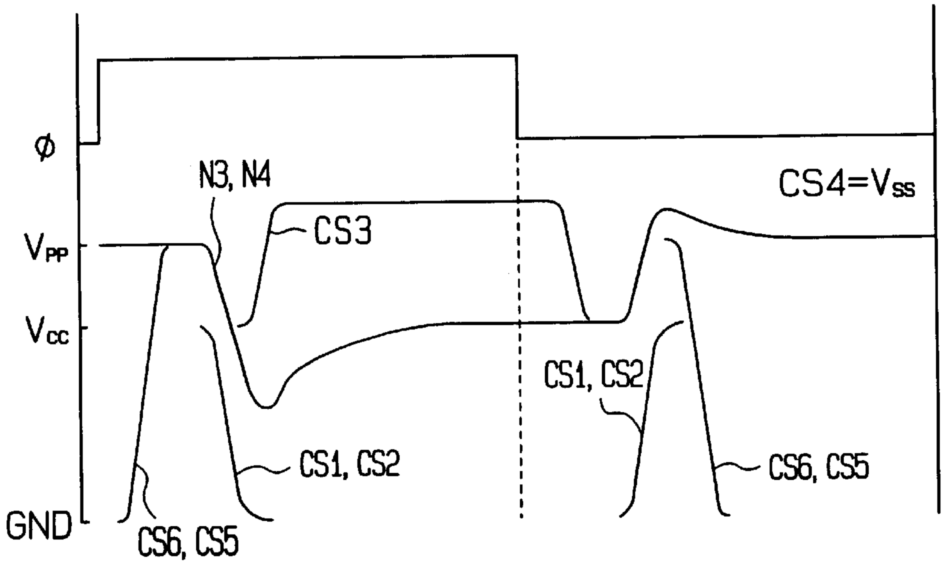
FIG. 13 is a timing waveform diagram illustrating the one-stage step-up operation of the stepped-up voltage generator of FIG. 8.

When the voltage of the voltage supply Vcc is higher than the predetermined voltage, the detection circuit 3 outputs the detection signal RS at the H level, and the one-stage step-up operation as shown in FIG. 13 is performed.

The control signal generator 2 provides the control signal CS4 whose level is fixed to the level of the supply voltage Vss to the transistor Tr2, thus turning on the transistor Tr2. The transfer gate 6*a* is conducting, and the transfer gate 6*b* is nonconducting, so that control signals CS1 and CS2 having the same phase are output. The transfer gate 6*c* is conducting, and the transfer gate 6*d* is nonconducting, so that the output signal of the NAND gate 7*c* is output as the control signal CS5.

Under this situation, when the clock signal ϕ rises, the control signals CS5 and CS6 rise to the level of the supply voltage Vpp from the level of the supply voltage Vss. This turns off the transistors Tr3 and Tr4. Then, the control signals CS1 and CS2 fall, thus reducing the potentials at the nodes N3 and N4.

Then, the control signal CS3 rises from the level of the supply voltage Vcc, thus turning on the transistor Tr1. As a result, the nodes N3 and N4 are charged to the level of the supply voltage Vcc.

When the clock signal ϕ falls, the control signal CS3 falls to the level of the supply voltage Vcc, thus turning off the transistor Tr1. Then, the control signals CS1 and CS2 rise to the H levels, thereby increasing the voltages of the nodes N3 and N4.

Next, the control signals CS5 and CS6 fall to the level of the supply voltage Vss, thus turning on the transistors Tr3 and Tr4. Consequently, the charged voltages at the nodes N3 and N4 are output as the supply voltage Vpp. At this time, the parallel connection of the capacitors C3 and C4 and the serial connection of the capacitors C3 and C4 coexist.

The above-described operation is repeated in accordance with the rising and falling of the clock signal ϕ, thereby generating the stepped-up voltage Vpp. In this case, the one-stage step-up operation is performed when the capacitors C3 and C4 simultaneously perform the step-up operations. Therefore, the current supplying capability in the one-stage step-up operation is greater than that in the two-stage step-up operation.

The stepped-up voltage generator 400 has the following advantages.

(1) The one-stage step-up operation and two-stage step-up operation are automatically switched from one to the other in accordance with the level of the supply voltage Vcc.

(2) Based on the result of comparison of a predetermined voltage with the supply voltage Vcc by the detection circuit 3, the one-stage step-up operation and two-stage step-up operation are switched from one to the other. By adequately setting the supply voltage Vcc for the switching the one-stage step-up operation and two-stage step-up operation, it is possible to acquire a sufficient stepped-up voltage Vpp through the two-stage step-up operation when the supply voltage Vcc is relatively low, and to provide a sufficient current supplying capability while improving the power efficiency through the one-stage step-up operation when the supply voltage Vcc is relatively high.

(3) As shown in FIG. 7, the one-stage step-up operation and two-stage step-up operation are switched from one to the other at a point P where the maximum supply current I1*a* of the one-stage step-up operation crosses the allowable supply current I2 of the two-stage step-up operation. This allows the stepped-up voltage generator 400 to operate with the maximum driving performance. It is therefore possible to sufficiently secure the operational margin of the stepped-up voltage generator 400.

(4) Since the operational margin of the stepped-up voltage generator 400 is secured, the reliability is ensured even by using the capacitors C3 and C4 that have relatively small capacitances. This reduces the areas of the capacitors C3 and C4, which eventually reduces the area of a semiconductor memory device in which the stepped-up voltage generator 400 is installed.

In the third embodiment, three or more capacitors may be used. In this case, four or more transistors should be connected in series between the voltage supply Vcc and the output terminal of the stepped-up voltage generator 400, and two or more capacitive-connection switching transistors should be connected between a node between the adjoining transistors and the output terminal of the stepped-up voltage generator 400.

Figure 14:
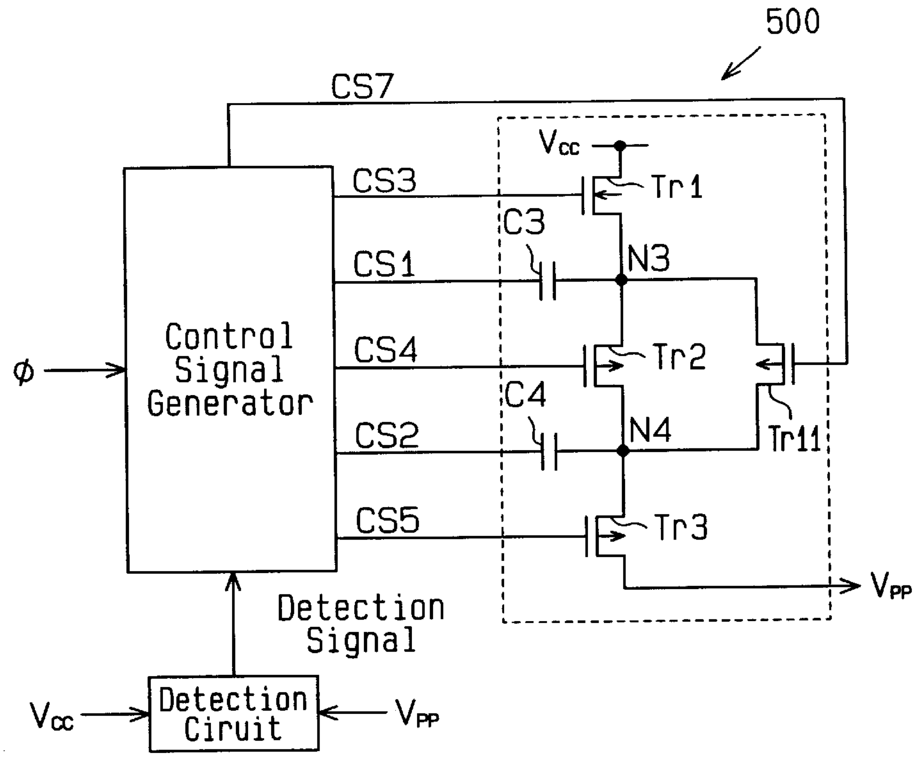
FIG. 14 is a schematic circuit diagram of a stepped-up voltage generator according to a fourth embodiment of the present invention.

As shown in FIG. 14, a stepped-up voltage generator 500 according to a fourth embodiment of the present invention includes a PMOS transistor Tr11 connected in parallel to the transistor Tr2. The transistor Tr11 is controlled by a control signal CS7.

The transistor Tr11 is normally set on by the control signal CS7 at the level of the supply voltage Vss in the one-stage step-up operation and is normally set off by the control signal CS7 at the level of the supply voltage Vpp in the two-stage step-up operation.

In the fourth embodiment, three or more capacitors may be used. In this case, four or more transistors should be connected in series between the voltage supply Vcc and the output terminal of the stepped-up voltage generator 500, and a capacitive-connection switching transistor should be connected at a node of each set of adjoining transistors.

Figure 15A:
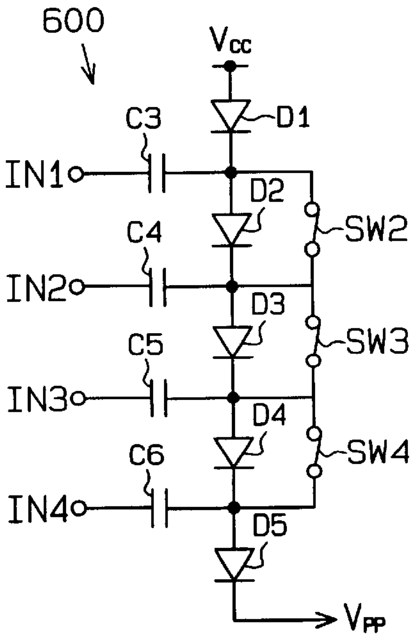
FIG. 15A is a schematic circuit diagram of a stepped-up voltage generator with all switch circuits being conducting according to a fifth embodiment of the present invention.
Figure 15:
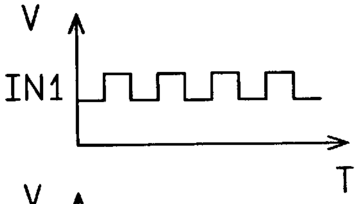
FIGS. 15B through 15E are waveform diagrams of input signals supplied to the stepped-up voltage generator of FIG. 15A.
Figure 15:
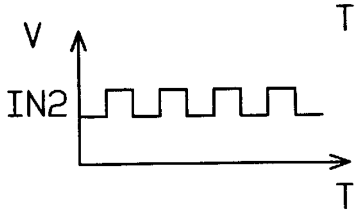
Figure 15:
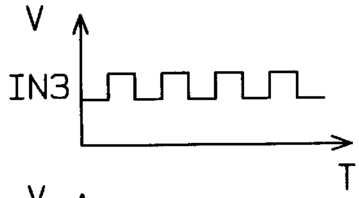
Figure 15:
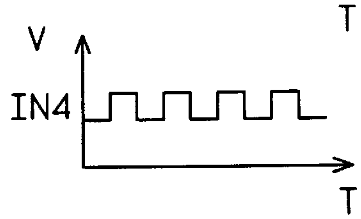
Figure 16A:
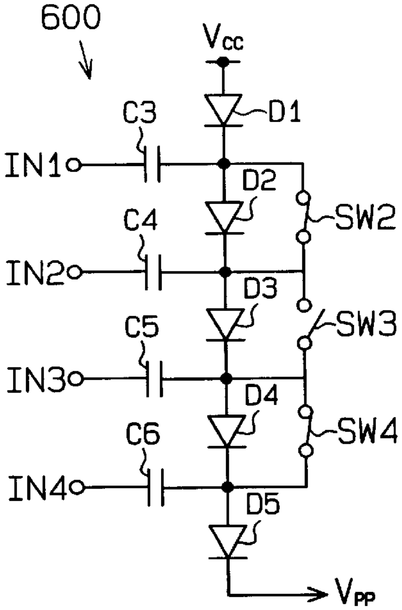
FIG. 16A is a schematic circuit diagram of a stepped-up voltage generator with one switch circuit being non-conducting according to the fifth embodiment of the present invention.
Figure 16:
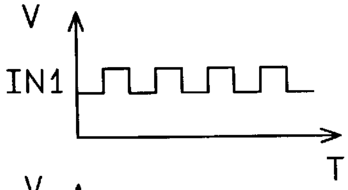
FIGS. 16B through 16E are waveform diagrams of input signals supplied to the stepped-up voltage generator of FIG. 16A.
Figure 16:
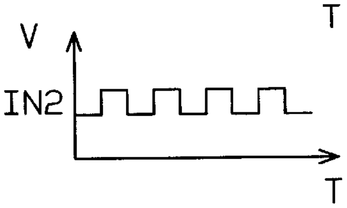
Figure 16:
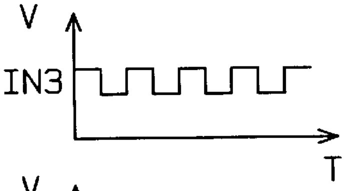
Figure 16:
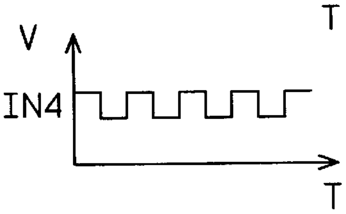
Figure 17A:
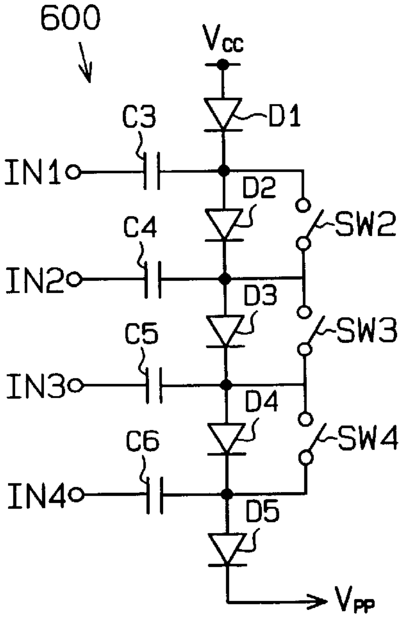
FIG. 17A is a schematic circuit diagram of a stepped-up voltage generator with all switch circuits being non-conducting according to the fifth embodiment of the present invention.
Figure 17:
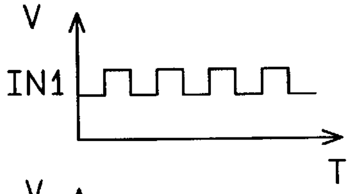
FIGS. 17B through 17E are waveform diagrams of input signals supplied to the stepped-up voltage generator of FIG. 17A.
Figure 17:
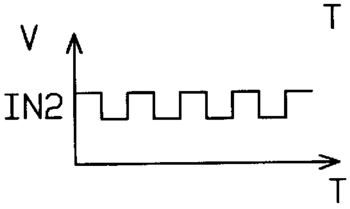
Figure 17:
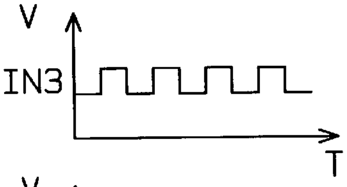
Figure 17:
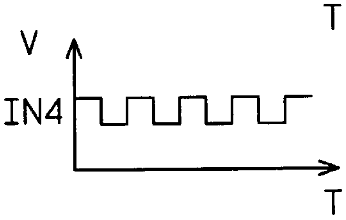

As shown in FIGS. 15A, 16A and 17A, a stepped-up voltage generator 600 according to a fifth embodiment of the invention includes five diodes D1 to D5 connected in series between the voltage supply Vcc and the output terminal of the stepped-up voltage generator 600, capacitors C3 to C6 connected to the respective nodes between the adjoining diodes, and switch circuits SW2 to SW4 connected in parallel to the respective diodes D2 to D4. The switch circuits SW2 to SW4 are connected in series between a node disposed between the diodes D1 and D2 and a node disposed between the diodes D4 and D5.

All the switch circuits SW2 to SW4 are conducting as shown in FIG. 15A, and clock input signals IN1 to IN4 having the same phase are respectively supplied to the capacitors C3 to C6 as shown in FIGS. 15B, 15C, 15D and 15E. In this case, the one-stage step-up operation is performed with the diodes D2, D3 and D4 short-circuited. In the one-stage step-up operation mode, as the step-up operations of the capacitors C3, C4, C5 and C6 are performed in parallel, the allowable supply current is increased further.

The switch circuit SW3 is only nonconducting as shown in FIG. 16A. The clock input signals IN1 and IN2 having the same phase are respectively supplied to the capacitors C3 and C4 as shown in FIGS. 16A and 16B. The clock input signals IN3 and IN4 having the opposite phase to the phase of the clock input signals IN1 and IN2 are respectively supplied to the capacitors C5 and C6 as shown in FIGS. 16C and 16D. In this case, the two-stage step-up operation is performed with the diodes D2 and D4 short-circuited. In the two-stage step-up operation mode, because the step-up operation of the capacitors C3 and C4 and the step-up operation of the capacitors C5 and C6 are performed in parallel, the allowable supply current is increased further.

All the switch circuits SW2 to SW4 are nonconducting as shown in FIG. 17A. The clock input signals IN1 and IN3 having the same phase are respectively supplied to the capacitors C3 and C5 as shown in FIGS. 17B and 17D. The clock input signals IN2 and IN4 having the opposite phase to the phase of the clock input signals IN1 and IN3 are respectively supplied to the capacitors C4 and C6 as shown in FIGS. 17C and 17E. In this case, the four-stage step-up operation is performed by the respective capacitors. In the four-stage step-up operation mode, the step-up operations of the capacitors C1, C2, C3 and C4 are performed providing a higher stepped-up voltage Vpp.

In the stepped-up voltage generator 600 of the fifth embodiment, the optimal allowable supply current and step-up performance can be selected by adequately selecting the one-stage step-up operation, two-stage step-up operation and four-stage step-up operation.

Figure 18A:
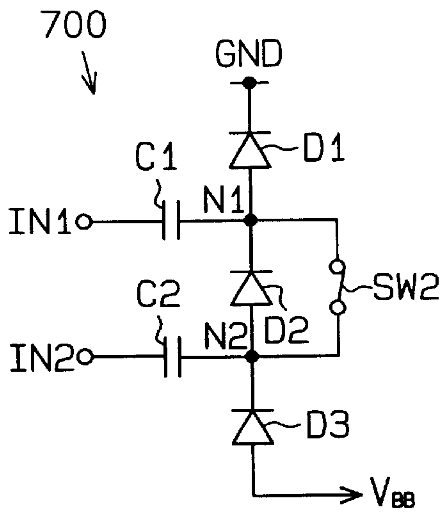
FIG. 18A is a schematic circuit diagram of a stepped-down voltage generator with a switch circuit being conducting according to a sixth embodiment of the present invention.
Figure 19A:
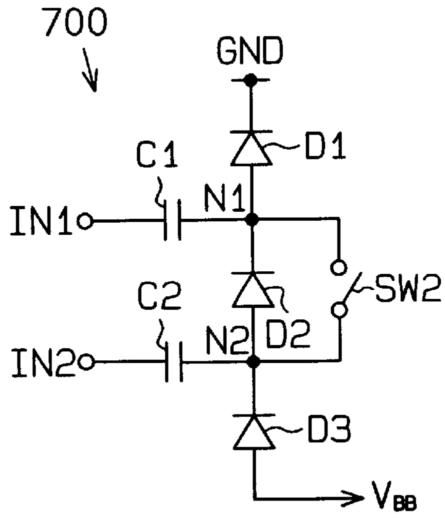
FIG. 19A is a schematic circuit diagram of a stepped down voltage generator with the switch circuit being non-conducting according to the sixth embodiment of the present invention.

As shown in FIGS. 18A and 19A, a negative voltage generator 700 in a sixth embodiment includes diodes D1, D2 and D3 connected in series, and capacitors C1 and C2 connected to the nodes disposed between adjoining diodes, and a switch circuit SW2 connected in parallel to the diode D2. The supply voltage Vss (GND) is supplied to the cathode of the diode D1.

Figure 18B:
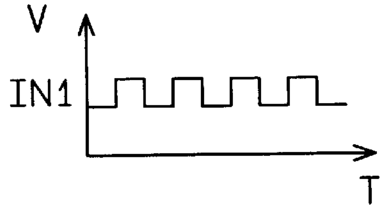
FIGS. 18B and 18C are waveform diagrams of input signals supplied to the stepped-down voltage generator of FIG. 18A.
Figure 18C:
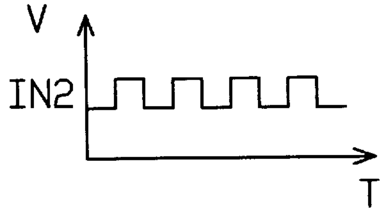

In the one-stage step-up operation mode, the switch circuit SW2 is conducting, so that the clock input signals IN1 and IN2 having the same phase are respectively supplied to the capacitors C1 and C2 (see FIGS. 18B and 18C). The parallel step-down operation of the capacitors C1 and C2 generates, for example, a substrate supply voltage VBB which is lower than the supply voltage Vss.

Figure 19B:
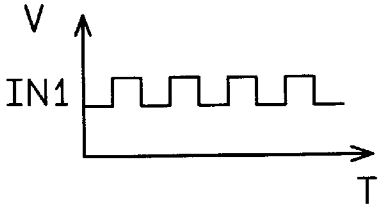
FIGS. 19B and 19C are waveform diagrams of input signals supplied to the stepped-down voltage generator of FIG. 19A.
Figure 19C:
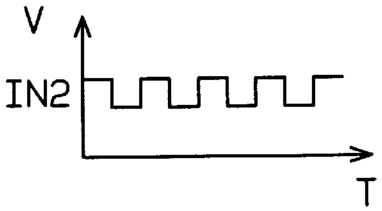

In the two-stage step-up operation mode, the switch circuit SW2 is nonconducting so that the clock input signals IN1 and IN2 having the opposite phases are respectively supplied to the capacitors C1 and C2 (see FIGS. 19B and 19C). The two-stage step-down operation of the capacitors C1 and C2 generates the substrate supply voltage VBB.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A voltage conversion circuit comprising:

a plurality of voltage conversion cells, each of the voltage conversion cells including a capacitor element;

a switch circuit, connected to the plurality of voltage conversion cells, for selectively switching between parallel connection of a plurality of voltage conversion cells and serial connection of a plurality of voltage conversion cells; and a control circuit, connected to the switch circuit and the plurality of voltage conversion cells, for controlling the switch circuit to selectively perform first voltage conversion of an input voltage and second voltage conversion, wherein in the first voltage conversion, the control circuit provides first control signals having the same phase to the plurality of parallel-connected voltage conversion cells to perform a step-up operation or a step-down operation in parallel, and wherein in the second voltage conversion, the control circuit provides second control signals having opposite phases to the plurality of series-connected voltage conversion cells to perform the step-up operation or the step-down operation in order.

2. The voltage conversion circuit according to claim 1, further comprising a detection circuit, connected to the control circuit, for detecting the input voltage by comparing the input voltage with a predetermined reference voltage.

3. The voltage conversion circuit according to claim 1, further comprising a detection circuit, connected to the control circuit, for detecting the input voltage by comparing the input voltage with a voltage generated by voltage conversion using the plurality of voltage conversion cells.

4. The voltage conversion circuit according to claim 1, wherein the control circuit controls the switch circuit such that a parallel connection state of a plurality of voltage conversion cells and a series connection state of a plurality of voltage conversion cells are mixed in the second voltage conversion.

5. The voltage conversion circuit according to claim 1, wherein a single step-up operation is performed in the first voltage conversion and plural step-up operations are performed in the second voltage conversion.

6. A voltage conversion circuit comprising:

a plurality of voltage conversion cells, each of the voltage conversion cells including a capacitor element;

a plurality of switch circuits connected between an input voltage and an output terminal of the voltage conversion circuit, wherein the plurality of voltage conversion cells are respectively connected to a plurality of nodes disposed between adjoining switch circuits to provide serial connection of a plurality of voltage conversion cells;

one or more cell-connection switch circuits connected between one or more of the plurality of nodes and the output terminal of the voltage conversion circuit to provide parallel connection of a plurality of voltage conversion cells; and a control circuit, connected to the plurality of switch circuits, the one or more cell connection switch circuits and the plurality of voltage conversion cells, for controlling the plurality of switch circuits and the one or more cell-connection switch circuits to selectively perform first voltage conversion of an input voltage and second voltage conversion of the input voltage, wherein in the first voltage conversion, the control circuit provides first control signals having the same phase to the plurality of parallel-connected voltage conversion cells to perform a step-up operation or a step-down operation in parallel, and wherein in the second voltage conversion, the control circuit provides second control signals having opposite phases to the plurality of series-connected voltage conversion cells to perform the step-up operation or the step-down operation in order.

7. The voltage conversion circuit according to claim 6, further comprising a detection circuit, connected to the control circuit, for detecting the input voltage by comparing the input voltage with a predetermined reference voltage.

8. The voltage conversion circuit according to claim 6, further comprising a detection circuit, connected to the control circuit, for detecting the input voltage by comparing the input voltage with a voltage generated by voltage conversion using the plurality of voltage conversion cells.

9. A voltage conversion circuit comprising:

a plurality of voltage conversion cells, each of the voltage conversion cells including a capacitor element;

a plurality of switch circuits connected between an input voltage and an output terminal of the voltage conversion circuit, wherein the plurality of voltage conversion cells are respectively connected to a plurality of nodes disposed between adjoining switch circuits to provide serial connection of a plurality of voltage conversion cells;

one or more cell-connection switch circuits connected to one or more pairs of nodes in parallel to the plurality of switch circuits to provide parallel connection of a plurality of voltage conversion cells; and a control circuit, connected to the plurality of switch circuits, the one or more cell-connection switch circuits and the plurality of voltage conversion cells, for controlling the plurality of switch circuits and the one or more cell-connection switch circuits to selectively perform first voltage conversion of an input voltage and second voltage conversion of the input voltage, wherein in the first voltage conversion, the control circuit provides first control signals having the same phase to the plurality of parallel-connected voltage conversion cells to perform a step-up operation or a step-down operation in parallel, and wherein in the second voltage conversion, the control circuit provides second control signals having opposite phases to the plurality of series connected voltage conversion cells to perform the step-up operation or the step-down operation in order.

10. The voltage conversion circuit according to claim 9, further comprising a detection circuit, connected to the control circuit, for detecting the input voltage by comparing the input voltage with a predetermined reference voltage.

11. The voltage conversion circuit according to claim 9, further comprising a detection circuit, connected to the control circuit, for detecting the input voltage by comparing the input voltage with a voltage generated by voltage conversion using the plurality of voltage conversion cells.

12. A control circuit for a voltage conversion circuit including a plurality of voltage conversion cells, each of the voltage conversion cells including a capacitor element and a switch circuit connected to the plurality of voltage conversion cells for selectively switching between parallel connection of a plurality of voltage conversion cells and serial connection of a plurality of voltage conversion cells, wherein the control circuit is connected to the switch circuit to control the switch circuit to selectively perform first voltage conversion of an input voltage and second voltage conversion of the input voltage, wherein in the first voltage conversion, the control circuit provides first control signals having the same phase to the plurality of parallel-connected voltage conversion cells to perform a step-up operation or a step-down operation in parallel, and wherein in the second voltage conversion, the control circuit provides second control signals having opposite phases to the plurality of series connected voltage conversion cells to perform the step-up operation or the step-down operation in order.

* * * * *